(12) United States Patent
Neubauer et al.

(10) Patent No.: US 9,114,563 B2
(45) Date of Patent: Aug. 25, 2015

(54) ASEPTIC BLOW MOULDING MACHINE WITH STERILE REMOVAL OF AIR

(75) Inventors: Michael Neubauer, Regensburg (DE); Juergen Soellner, Beratzhausen (DE); Florian Geltinger, Donaustauf (DE)

(73) Assignee: KRONES AG, Neutraubling (DE)

( * ) Notice: Subject to any disclaimer, the term of this patent is extended or adjusted under 35 U.S.C. 154(b) by 396 days.

(21) Appl. No.: 13/470,249

(22) Filed: May 11, 2012

(65) Prior Publication Data

US 2012/0286459 A1 Nov. 15, 2012

(30) Foreign Application Priority Data

May 11, 2011 (DE) .................. 10 2011 101 256

(51) Int. Cl.
*B29C 49/62* (2006.01)
*B29C 49/46* (2006.01)
*B29C 49/42* (2006.01)

(52) U.S. Cl.
CPC ............. *B29C 49/62* (2013.01); *B29C 49/46* (2013.01); *B29C 49/4205* (2013.01); *B29C 2049/4679* (2013.01); *B29C 2049/4697* (2013.01)

(58) Field of Classification Search
CPC ........... B29C 49/46; B29C 2049/4679; B29C 2049/4694; B29C 2049/4697; B29C 49/62; B29C 2049/622; B29C 2049/625; B29C 49/4205
USPC .................. 425/73, 522, 225, 227
See application file for complete search history.

(56) References Cited

U.S. PATENT DOCUMENTS

| 4,026,982 A | 5/1977 | Dardaine et al. |
| 4,120,924 A * | 10/1978 | Rainville ............... 264/45.5 |
| 4,699,585 A * | 10/1987 | Giese et al. ............ 425/522 |
| 5,068,075 A * | 11/1991 | Dundas et al. .......... 264/505 |
| 5,217,729 A * | 6/1993 | Terauchi et al. ........ 425/522 |
| 6,759,003 B1 * | 7/2004 | Obara et al. ........... 264/529 |
| 2009/0282711 A1 | 11/2009 | Naher et al. |
| 2011/0037187 A1 | 2/2011 | Winzinger et al. |
| 2011/0286899 A1 * | 11/2011 | Martini et al. ......... 423/210 |

FOREIGN PATENT DOCUMENTS

| DE | 25 08 320 C2 | 9/1975 |
| DE | 200 23 423 U1 | 4/2004 |
| WO | 2010/020529 A2 | 2/2010 |

OTHER PUBLICATIONS

Chinese Office Action dated Feb. 7, 2014, issued in corresponding Chinese Application No. 201210141379.9.
German Search Report dated Feb. 16, 2012, issued in corresponding German Application No. 10 2011 101 256.0.
Chinese Office Action issued in corresponding Chinese Patent Application No. 201210141379.9.

* cited by examiner

*Primary Examiner* — Robert B Davis
(74) *Attorney, Agent, or Firm* — Novak Druce Connolly Bove + Quigg LLP

(57) ABSTRACT

Apparatus for the shaping of plastics material pre-forms into containers includes at least one blow mold with two blow mold parts movable with respect to each other. The blow mold forms a cavity inside which the pre-forms may be shaped into the containers. The apparatus includes a stressing device which acts upon the pre-forms with a flowable medium for their expansion, a conveying device which conveys the blow mold along a pre-set conveying path, and a clean room inside which the blow mold may be conveyed during the expansion of the pre-forms. An inner wall of the blow mold facing the pre-form has at least one opening through which a flowable medium may be removed out of the cavity during the expansion procedure. A flow connection provided between the opening and the clean room is sealed off from a non-sterile environment of the clean room.

11 Claims, 3 Drawing Sheets

ASEPTIC BLOW MOULDING MACHINE WITH STERILE REMOVAL OF AIR

CROSS-REFERENCE TO RELATED APPLICATION

This application claims the benefit of priority of German Patent Application No. 10 2011 101 256.0, filed May 11, 2011, pursuant to 35 U.S.C. 119(a)-(d), the disclosure of which is incorporated herein by reference.

TECHNICAL FIELD

The present disclosure relates to an apparatus for the shaping of plastics material pre-forms into plastics material containers.

BACKGROUND

Apparatuses for the shaping of plastics material pre-forms into plastics material container have long been known from the prior art. In this case heated plastics material pre-forms are usually shaped into plastics material containers by being acted upon with compressed air in a plurality of blow moulding stations.

In recent years aseptic blow moulding machines have also become known in which the shaping procedure is carried out inside a clean room. A machine of this type is known from WO 2010 020529 A2. This machine has a clean room in which the individual blow moulding stations are arranged. In this case this clean room and articles present therein have to be sterilized before the start of production. This sterilization procedure also comprises in this case the entire blow moulding station, i.e. the blow moulds, the transfer star wheels, possible blowing nozzles and the like.

In this case it is also known from the internal prior art of the Applicants that the blow moulds can have small openings in their inner wall in order to be able to remove a gaseous medium, such as for example displaced air, during the blow moulding procedure. The sterilization of these openings, however, represents a considerable problem. In addition, a contamination of the blow moulds can be caused by these openings in the prior art.

In the design of an aseptic blow moulding machine the sterilization of the clean room and the parts present therein is crucial. Only by reliable sterilization can a germ-free atmosphere be achieved, which is important for the aseptic treatment of containers and the filling of beverages.

Therefore it may be desirable to provide an improved possibility of maintaining the sterility in a clean room of this type or in a blow moulding machine of this type respectively.

SUMMARY

According to various aspects of the disclosure, an apparatus for the shaping of plastics material pre-forms into plastics material containers has at least one blow mould with at least two blow mould parts capable of being moved with respect to each other. These blow mould parts in this case form a cavity inside which the plastics material pre-forms are capable of being shaped into the plastics material containers. In addition, the apparatus has a stressing apparatus which acts upon the plastics material pre-forms with a flowable medium for their expansion as well as a conveying device which conveys the blow mould along a pre-set conveying path. In addition, the apparatus has a clean room, inside which the blow mould is capable of being conveyed during the expansion of the plastics material pre-forms, this clean room being demarcated from a non-sterile environment by means of at least one wall. In this case an inner wall of the blow mould facing the plastics material pre-forms has at least one opening through which a flowable medium is capable of being removed out of the cavity during the expansion procedure.

According to the disclosure a flow connection is provided between this opening and the clean room and this flow connection is sealed off from the non-sterile environment of the clean room.

It is therefore proposed that during the expansion procedure a gaseous medium should be removed by way of the aforesaid openings inside the blow mould exclusively into the clean room and not into the non-sterile environment. In this way, a re-contamination of the clean room by the non-sterile environment can be prevented the other way round.

In an exemplary embodiment the apparatus has a plurality of blow moulds or blow moulding stations. Expressed more precisely, a plurality of blow moulding stations can be provided which can have in each case blow mould carriers and blow moulds arranged on these blow mould carriers. It may be advantageous for the conveying device to be a blowing wheel on which a plurality of blow moulding stations are arranged. In an exemplary embodiment the clean room or sterile room is designed in the form of a duct around the conveying path of the individual blow moulding stations.

In this case it is possible for the individual carriers with the blow moulds arranged thereon to be capable of being folded apart in order to be able to receive the plastics material pre-forms in an opened state.

It may be advantageous for a plurality of the openings mentioned above to be arranged in the inner wall of the blow moulds in order to be able to uniformly receive at the same time the air displaced during the expansion procedure by the bottle produced. In an exemplary embodiment the clean room is also formed at least in part by the conveying device itself.

In an exemplary embodiment the apparatus has a supply line in order to supply a flowable sterilization agent to the blow mould, in which case a flow connection is present at least for a time between the supply line and the aforesaid opening. The blow moulds can also be sterilized by way of this supply line. The sterilization agent is in particular $H_2O_2$, but it would also be possible for peracetic acid or other sterilization agents for example to be used. In this case it is possible for this sterilization agent to arrive in the cavity by way of the aforesaid bores.

It may be advantageous for the aforesaid connection between a reservoir for the sterilization agent and the components to be sterilized to be formed for a time for the purpose of sterilization. This can be carried out in different ways. In this way, it would be possible for example for a stressing device, such as a blow moulding piston or a blowing nozzle to be used for the introduction of the sterilization agent. In this case the blowing nozzle itself can also be sterilized. In addition, it would also be possible for a sterilization gas to escape from the blowing nozzle into the isolator or the clean room and to sterilize it. In order to sterilize places which are difficult to reach, such as for example the above-mentioned openings or aeration bores in the blow moulds, it would also be possible for the blowing nozzle to be positioned on the blow moulds and for the sterilization agent to be blown directly into the blow moulds.

In an exemplary embodiment the apparatus thus has a storage device for storing the flowable sterilization agent, and this storage device is connected at least for a time in terms of flow to the opening (of the blow mould) mentioned above. In this way, the sterilization agent can escape by way of the opening into the blow mould.

In an exemplary embodiment the flow connection extends at least locally over the stressing device. In this way it is possible for the sterilization agent to be supplied to the blow mould starting from the stressing device such as a blowing nozzle. This is explained in greater detail with reference to the figures.

In an exemplary embodiment the apparatus has a by-pass element which is movable with respect to the blow mould and which conveys the sterilization agent to the opening in a sterilization operation. In this way it is possible for an additional element, such as for example a so-called SIP cap, to be used for the improved sterilization of the aerating bores possibly present in the blow moulds. In this case this component can be inserted between the blow mould or the blow mould parts and the blowing nozzle. After that it is possible for the stressing device or the blowing nozzle to move downwards and to blow the sterilization agent into the aforesaid SIP cap. On account of the special design the SIP cap can then convey the sterilization agent—introduced through the blowing nozzle—directly into the aerating bores of the blow moulds. This results in a thorough rinsing of the bores with sterilization agent and thus a satisfactory sterilization. Other designs of the SIP cap, however, are also possible.

In addition, it would also be possible for the aforesaid SIP cap or CIP cap to be omitted. If for example the stressing device or the blowing nozzle blows the sterilization agent directly into the blow moulds, a major part of the sterilization agent will escape by way of a mould gap (the size of which is usually in the region of 2/10 mm) between the two mould halves, instead of choosing the path through the aerating bores. This problem can be solved by an apparatus which makes it possible for the mould gap to be reduced as much as possible during the sterilization and after that to be brought to the required dimension of approximately 0.2 mm again for the production. This distance of approximately 0.2 mm may be advantageous so that the air between the container and the blow mould can escape out of the mould during the expansion of the containers.

In addition, it would also be possible for the sterilization agent to be conveyed by way of a component intended specifically for this purpose, such as for example a so-called SIP piston. This can be made movable and for sterilization purposes it can dock onto the component to be sterilized. This can then likewise be the blow moulds. The actual sterilization can then take place in a manner similar to that described above.

In an exemplary embodiment the blow mould has at least one duct for conveying the flowable medium and/or the sterilization agent, this duct being connected in terms of flow to the opening and the duct extending in a longitudinal direction of the blow mould. In this case it may be advantageous for this duct to be formed in an inner wall of the blow mould. It may be particularly preferred for the aforesaid duct to be formed completely in the aforesaid inner wall. In addition, it is also possible for this duct to be connected in terms of flow to the clean room.

The present disclosure further relates to a blow mould for shaping plastics material pre-forms into plastics material containers. This blow mould has at least one first blow mould part and one second blow mould part, these two blow mould parts being movable with respect to each other and the blow mould parts forming a cavity inside which the plastics material pre-forms are capable of being expanded to form the plastics material containers by being acted upon with a gaseous medium. In addition, the blow mould or the blow mould parts has or have at least one opening in a wall of the blow mould facing the plastics material pre-forms in order to remove a gaseous medium during the expansion procedure and/or to supply a flowable sterilization agent to the blow mould during the sterilization procedure. It may be advantageous for this opening to be connected in terms of flow to a duct extending inside a wall in the blow mould or the blow mould parts and for this duct to extend at least at a distance in a longitudinal direction of the blow mould.

With respect to the blow mould it would thus also be suggested that it should have in the interior thereof a duct which can be used in particular for the removal of air from the closed blow mould, optionally however, also for the supply of a sterilization agent.

Although the aforesaid openings in the inner wall of the blow moulds are known in the prior art, the ducts attached to this opening usually extend in the radial direction, and this is simpler on manufacturing grounds than the procedure proposed here. With the procedure proposed here it is also possible, however, for the gaseous medium, i.e. in particular the blowing air, to be conveyed in the longitudinal direction of the container into the clean room.

In an exemplary embodiment the duct extending inside the wall is connected in terms of flow to the opening. This connecting duct can also extend in this case in a radial direction of the blow mould.

It may be advantageous for the aforesaid channel to be connected in terms of flow to a plurality of the openings specified above. In this case these openings can be arranged for example one above the other in the longitudinal direction of the blow mould. In addition, it would also be possible for a plurality of the specified ducts to be formed inside the wall of the blow mould or the blow mould parts.

The present disclosure further relates to a method of shaping plastics material pre-forms into plastics material containers, the plastics material pre-forms being shaped in a plurality of blow moulding stations or blow moulds to form the plastics material containers and the blow moulds being conveyed along a pre-set conveying path inside a clean room by means of a conveying device at least in part during their expansion, a gaseous medium being removed at least for a time during the expansion procedure by way of an opening arranged in a wall of the blow mould towards the plastics material pre-forms and/or a flowable medium being supplied at least for a time during a sterilization procedure to the blow mould by way of the opening towards the plastics material pre-forms.

According to the disclosure, starting from the opening, the gaseous medium passes exclusively into the clean room.

It is thus also proposed in terms of the method that the gaseous medium, such as for example the blowing air or air present inside the clean room, which is removed by way of the openings, does not pass in this case into the environment, however, but only into the clean room. In this way, it is also made easier in terms of the method for the individual blow moulding stations and also the interior of the clean room to be kept sterile.

Further advantages and embodiments are apparent from the appended drawings.

DETAILED DESCRIPTION

Figure 1:
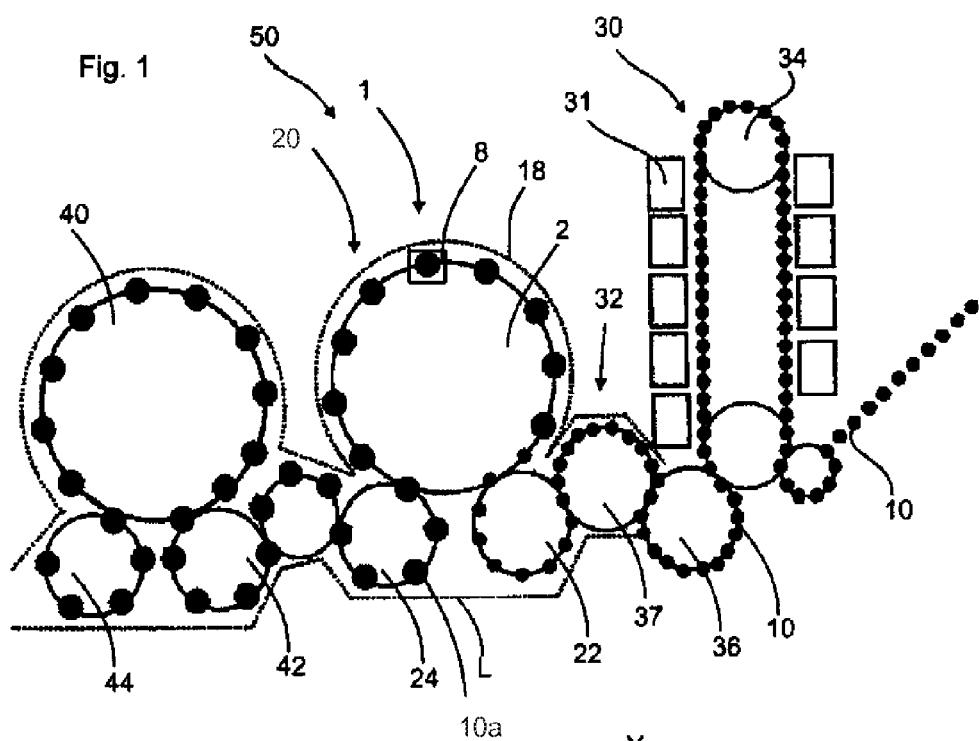
FIG. 1 is a diagrammatic illustration of a plant for producing plastics material containers.

FIG. 1 is a diagrammatic illustration of a plant for producing plastics material containers according to the prior art. This plant 50 has a heating device 30 in which plastics material pre-forms 10 are heated. In this case these plastics material pre-forms 10 are conveyed through this heating device 30 by means of a conveying device 34, such as a circulating chain here, and are heated in this case by a plurality of heating elements 31. This heating device 30 has attached to it a transfer unit 36 which transfers the pre-forms 10 to a sterilization device 32. This sterilization device 32 likewise has in this case a conveying wheel 37 and sterilization elements can be arranged on this conveying wheel 37 or in a stationary manner. Sterilization by hydrogen peroxide gas or by electromagnetic radiation is possible for example in this region. In particular, an internal sterilization of the pre-forms is carried out in this region.

The reference number 20 designates in its entirety a clean room, the external boundaries of which are indicated here by the dotted line L. In an exemplary embodiment the clean room 20 is not only arranged in the region of the conveying wheel 2 and the filling device 40, but it usually starts if possible in the region of the heating device 30, the sterilization device 32, the supply of the plastics material pre-forms and/or the production of the plastics material pre-forms. It is evident that this clean room 20 starts in the region of the sterilization unit 32. Separating-out devices can be provided in this region in order to introduce the plastics material pre-forms into the clean room 20 without too much gas flowing inside the clean room in this case and thus being lost.

As indicated by the broken line L, the clean room is adapted to the external shape of the individual components of the unit. In this way the volume of the clean room can be reduced.

The reference number 1 designates a shaping apparatus as a whole, in which a plurality of blow moulding stations or shaping stations 8 are arranged on a conveying wheel 2, only one of these blow moulding stations 8 being shown here. The plastics material pre-forms 10 are expanded by these blow moulding stations 8 to form containers 10a. Although it is not shown in detail here, the entire area of the conveying device 2 is not situated inside the clean room 20, but the clean room 20 or isolator is designed as it were in the form of a mini isolator inside the apparatus as a whole. In this way it would be possible for the clean room to be designed in the form of a duct at least in the region of the shaping apparatus 1.

The reference number 22 relates to a supply device which transfers the pre-forms to the shaping device 1, and the reference number 24 relates to a removal device which removes the plastics material containers 20 produced from the shaping apparatus 1. It will be seen that in the region of the supply device 22 and the removal device 24 the clean room 20 has recesses in each case which receive these devices 22, 24. In this way, a transfer of the plastics material pre-forms 10 to the shaping apparatus 1 or a transfer of the plastics material containers 10a from the shaping apparatus 1 may be carried out in a particularly advantageous manner.

The expanded plastics material containers are transferred to a filling device 40 by a transfer unit 42 and they are then removed from this filling device 40 by way of a further conveying unit 44. In this case the filling device 40 is also situated inside the aforesaid clean room 20. In the case of the filling device it would also be possible for the entire filling device 40 with for example a reservoir for a beverage not to be arranged completely inside the clean room 20, but also in this case only those areas in which the containers are actually guided. In this respect, it would also be possible for the filling device to be designed in a similar manner to the apparatus 1 for shaping plastics material pre-forms 10.

As mentioned, the clean room 20 is reduced in the region of the apparatus 1 to as small an area as possible, namely essentially to the blow moulding stations 8 themselves. As a result of this compact design of the clean room 20 it is possible in an easier and more rapid manner to produce a clean room generally and, in addition, a lower outlay is required in order to keep the system sterile in the operative phase. Less sterile air is also necessary, and this leads to smaller filter units and the risk of uncontrolled swirl formation is also reduced.

Figure 2:
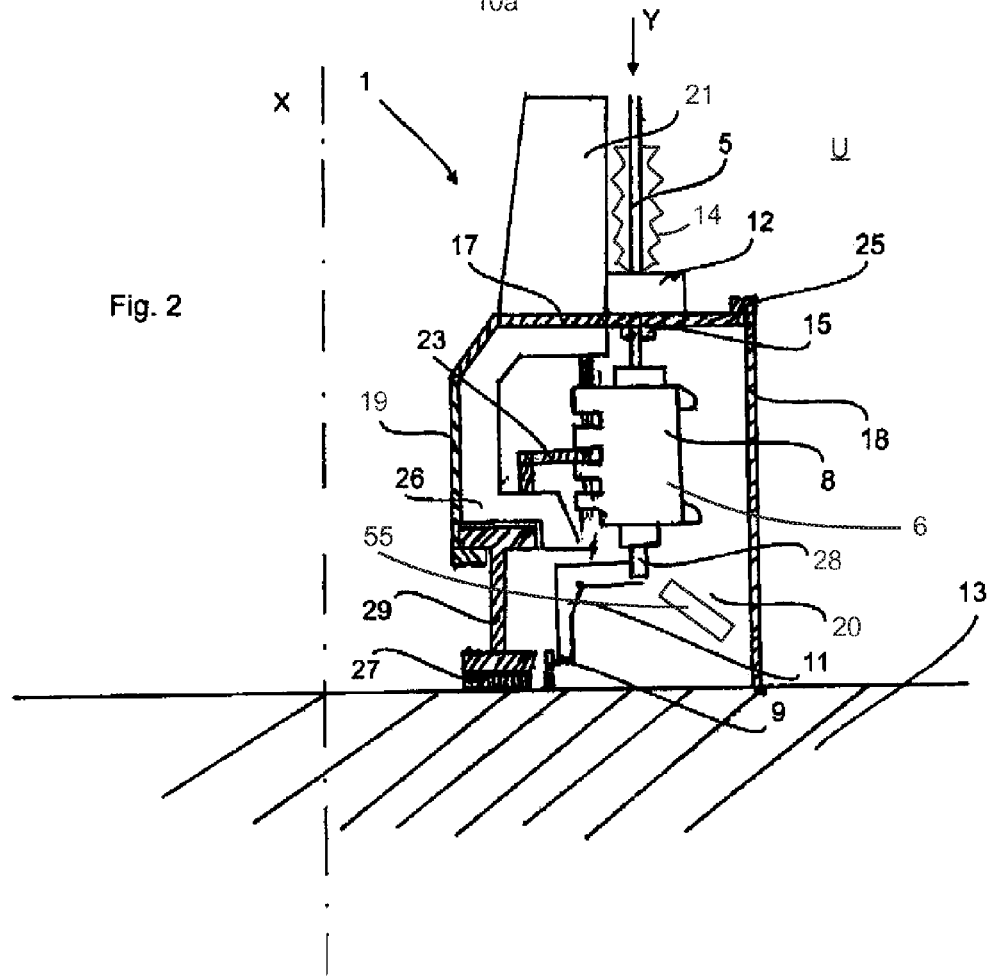
FIG. 2 is a view of a clean room in the region of a blow moulding station.

FIG. 2 is a detailed illustration of the apparatus 1 according to the prior art in the region of a blow moulding station 8. A plurality of blow moulding stations 8 of this type is moved by a conveying device 2 or a carrier so as to rotate about an axis X. As is evident from FIG. 2, the blow moulding station 8 is guided inside the clean room 20 which is designed in the form of a duct here. This clean room 20 is closed off by a movable lateral wall 19 and a cover 17 formed in one piece with this lateral wall 19. In this case this lateral wall 19 and the cover 17 rotate jointly with the blow moulding station 8.

The reference number 18 relates to a further wall which bounds the clean room 20. This wall 18 is here a wall which is situated on the outside and which is arranged in a stationary manner. The cover 17 and the wall 18 have provided between them a sealing device 25 which seals off from each other the elements 17 and 18 movable with respect to each other, for example, as mentioned above, by using a surge chamber. The lower region of the wall 18 is arranged on a floor 13 in a fixed and sealed manner. A carrier 26, which likewise moves in a rotating manner and on which a holding device 23 which holds the blow moulding station 8 is in turn provided, is provided inside the clean room 20 and in this case abutting directly against the wall 19.

The reference number 11 relates to a follower device which can be actuated by a guide cam 9 in order to open and close the blow moulding station on its path through the clean room 20, in order in particular to introduce the plastics material preform into the blow moulding station and also to remove it therefrom. In this case a guide cam 9 is also arranged inside the clean room 20. It would also be possible, however, for a portion 11 below the individual blow moulding stations 8 to be brought out of the clean room 20.

The conveying device 2 can have still further elements which are arranged above the clean room 20.

In this case the carrier 26 is arranged in a fixed manner on a holding body 29 and this holding body in turn is movable with respect to the floor 13. In this case the reference number 27 relates to a further sealing device which in this area too seals off the regions 13 and 29 which are movable with respect to each other.

The reference number 5 relates to a stretch bar which is movable with respect to the blow moulding station in order to stretch the plastics material pre-forms 10 in their longitudinal direction. In this case a slide 12 opposite which the stretch bar is movable in the direction Y is arranged on the cover 17. The reference number 21 relates to a further holding means for this slide 12 of the stretch bar 5.

It is evident that specific regions of the stretch bar are both outside the clean room 20 and inside the clean room 20 during the blow moulding procedure. For this purpose it is possible for a protective device such as a folding bellows 14 to be provided outside the clean room 20 or above the slide 12, the folding bellows 14 surrounding the stretch bar 5 so that no region of the stretch bar 5 comes directly into contact with the outer environment. The reference letter U designates the (non-sterile) environment of the clean room 20. The reference number 28 designates a carrier for carrying a floor mould which likewise forms a component of the blow mould. This carrier is likewise movable in the direction Y in this case.

The reference number 55 relates to a sterilization device which in this case may be preferably arranged in the interior of the clean room 20 and is used for the sterilization of the individual blow moulding stations or components of these blow moulding stations 8. This sterilization device 55 can act in this case upon the blow moulding stations 8 for example with hydrogen peroxide or another sterilization agent. In this case the sterilization device 55 can be arranged so as to be stationary and the shaping stations can move with respect to this sterilization device 55. This sterilization device or stressing device 55 can be situated on the conveying wheel 2 or on the vertical wall 18 or can be arranged so as to be generally stationary and can consist of nozzles or the like. In addition, it may be advantageous for sterile air to be introduced into the clean room 20 in order to sterilize the clean room 20 by way of the aeration system.

The blow moulds (not shown) are arranged inside the blow mould carrier 6. More precisely, two blow mould carrier parts can be provided in this case which are pivotable with respect to each other and which hold one blow mould part in each case. The blow moulds can be opened by this pivoting procedure for the introduction of plastics material pre-forms and for the removal of finished, blow-moulded containers. These blow mould carriers and blow moulds are likewise arranged inside the clean room in this case.

It may also, however, be possible and preferred (other than as shown in FIG. 2) for the conveying device 2 or the carrier to have a C-shaped external periphery which also forms the outer walls of the clean room in part. In this way, this C-shaped clean room wall rotates with the conveying device 2, i.e. the blowing wheel. In this embodiment the lower boundary of the clean room is arranged at a distance from the floor 13 and moves relative to the floor. In this way, the clean room can be made even smaller than as shown in FIG. 2. In this case it may be preferable for this C-shaped profile of the conveying device, which forms both an inner wall and a lower and upper cover of the clean room here, to be sealed off only with respect to the outer wall of the clean room. This outer wall may be preferably arranged in a stationary manner in this case.

Figure 3:
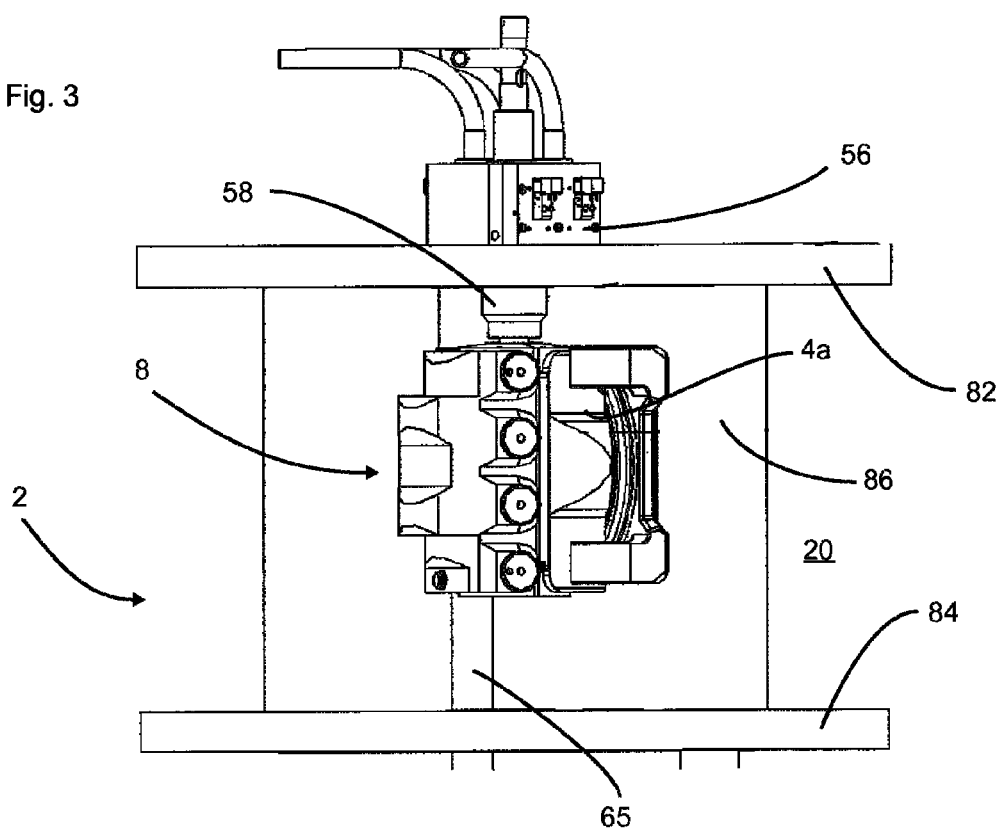
FIG. 3 is an illustration of a blow mould according to various aspects of the disclosure which is arranged on a carrier.

FIG. 3 is an illustration of a blow moulding station 8 arranged on a carrier 2. This carrier has in this case three wall regions 82, 84, 86 which also at the same time form the rotating parts of a boundary of the clean room 20. These movable parts 82, 84, 86 can be sealed off from a movable (outer) wall by means of a sealing device, such as for example a surge chamber.

The reference number 56 designates a valve block which in this case is arranged above the wall 82 and the reference number 58 designates a blowing nozzle which can be set on the plastics material pre-form in order to expand it. The blow moulding station additionally has a blow mould carrier on which a blow mould part (only one blow mould part 4a shown here) is arranged. These blow mould carriers can be pivoted towards each other with the aid of a pivot shaft 65 in order to open and close the blow moulds in this way.

Figure 4:
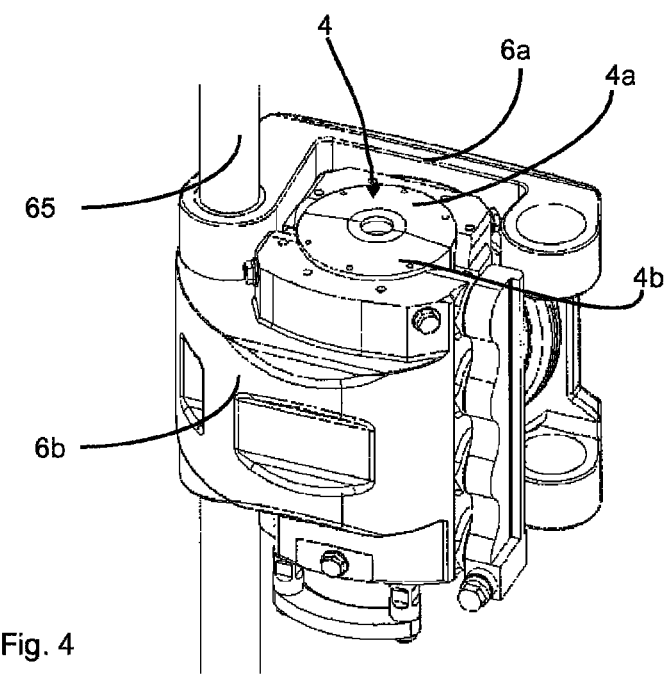
FIG. 4 is an illustration of a blow mould arranged in a blow mould carrier.

FIG. 4 is an illustration of a blow mould 4, more precisely two blow mould parts 4a, 4b which are arranged in each case on blow mould carrier parts 6a, 6b. These blow mould carrier parts can be pivoted in this case by means of a pivot shaft in order to open or close the blow mould 4 in this way. In this case it is possible for the blow mould parts 4a, 4b not to be arranged directly on the blow mould carrier parts 6a, 6b, but for the blow mould carrier parts 6a, 6b to have arranged on them carrier shells on which in turn the blow mould parts 4a, 4b are fastened. In addition, it would be possible for the pressure media to be provided which can reduce a gap between the blow mould parts 4a, 4b specially for a sterilization procedure. The reference number 4 designates the blow mould in its entirety.

Figure 5:
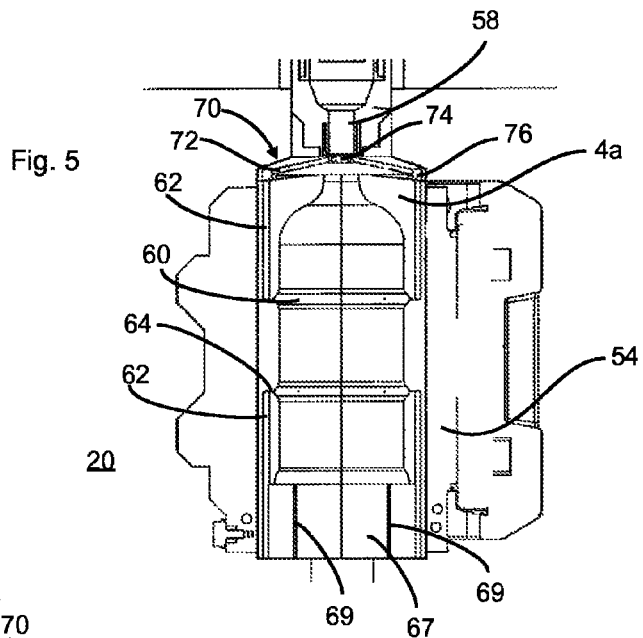
FIG. 5 is an illustration of an opened blow moulding station with a view of the blow mould.

FIG. 5 is a sectional illustration of a blow moulding station according to the disclosure. In this case too a blow mould or a blow mould part 4a is again evident, which is arranged in a blow mould carrier 6a. The reference number 60 designates a bore which is arranged in the blow mould part 4a in order to remove air during the expansion procedure. The reference number 67 designates a base part which closes the blow mould from the bottom. Aeration ducts 69 can also be provided in this base part. These aeration ducts 69 are also connected in terms of flow to the clean room 20 which surrounds the blow mould.

An additional element, such as in this case a so-called SIP cap 70, can be provided in the blow moulds for the improved sterilization of the aforesaid aeration bores. On account of its shape which covers the ducts 72, 74 and 76 here, the sterilization agent can be supplied to the blow moulds. In this way it is possible for a sterilization agent to be supplied directly to the blow mould by way of the blowing nozzle 58 and the ducts 72, 74 and 76, or, expressed more precisely, a duct system 62, 64, and for the sterilization agent to issue from there by way of the bores 60 into the interior of the blow mould. In this way, on account of its special shape this SIP cap 70 can convey the sterilization agent introduced through the blowing nozzle directly into the aeration bores of the blow moulds.

It would be further possible for sealing devices such as O-rings to be provided which additionally seal off the transitions, for example between the duct 76 and the duct 62 of the blow mould 4. In this way, a satisfactory rinsing of the bores with sterilization agent and thus a satisfactory sterilization are made possible. Designs would also be possible, however, in which the aforesaid SIP or CIP cap can be omitted. If the blowing nozzle blows directly into the interior of the blow moulds 4a, 4b, a considerable part of the sterilization agents will escape by way of a gap between the two mould halves instead of choosing the path through the aeration bores. As mentioned above, a remedy can be provided by the mould gap being reduced for the sterilization.

Furthermore it would also be possible for the sterilization agent to be introduced by a component provided specifically for this purpose (for example a so-called CIP piston) being introduced. This can be made movable and for sterilization purposes can dock onto the component to be sterilized. The component to be sterilized can be for example the blow moulds. The actual sterilization can then take place in a similar manner, as described above. It may be preferable, however, for the flow connection for sterilizing the clean room and also the objects and components to be produced by the blow moulding piston or the blowing nozzle.

In a further embodiment it would also be possible for use to be made of blowing valves present for the introduction of the sterilization agent. In this case it may be possible in a particularly preferred manner for valves used for the introduction of the sterilization agent to remain opened during the sterilization procedure. It would also be possible, however, for valves used for the introduction of the sterilization agent to be switched during the sterilization procedure, i.e. from an opened to a closed state and/or vice versa.

Figure 6:
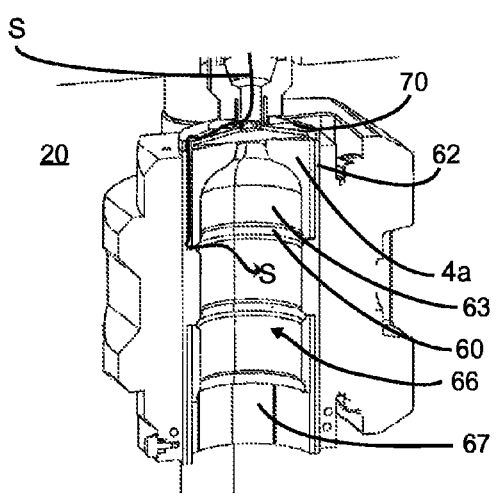
FIG. 6 is an illustration to explain the course of a sterilization agent.

FIG. 6 is a further illustration of a blow mould according to the disclosure, in which case a sterilization path S for the sterilization agent is also evident. It will be seen that the sterilization agent is conveyed into the blow mould through a duct 62 extending vertically and is finally discharged by way of the opening 60. In this case it is possible for the duct 72 shown in FIG. 4 to be made continuous and, in this way, introduction into a plurality of ducts 62 is possible. In usual working operation the SIP cap 70 is not connected to the blow moulds and, in this way, during the expansion procedure the blowing air can escape upwards into the clean room surrounding the blow moulding station. The reference number 66 designates the clean room (illustrated only in part here) formed by the blow mould.

Figure 7:
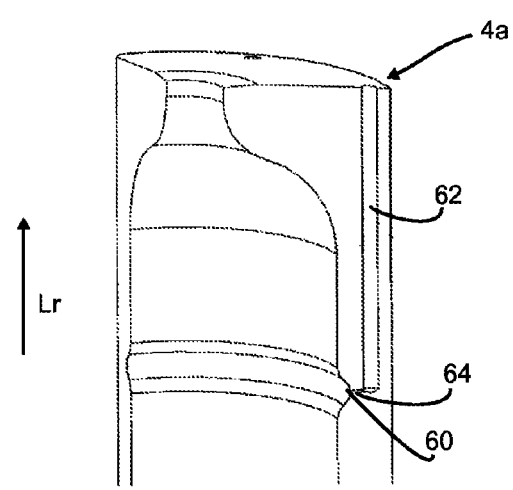
FIG. 7 is a detailed illustration of a blow mould.

FIG. 7 is a detailed illustration of a blow mould according to the disclosure. It is evident that this blow mould has a duct 62 which forms a flow connection between the opening 60 and the clean room 20. This duct 62 extends in this case in the vertical direction or the longitudinal direction Lr of the blow mould 4. Beside it a connecting duct 64, which connects the opening 60 to the duct 62, is provided. It may be advantageous for the duct 62 to have a larger flow cross-section than the connecting duct 64. In addition, the duct 62 can receive a plurality of connecting ducts 64 of this type which can be arranged one above the other for example. In this case it would be possible for the duct 62 to extend continuously along substantially the entire length of the blow mould 4, but it would also be possible for two ducts 62 to be provided, one of which is opened at the top and one of which is opened at the bottom. The reference number 63 designates an inner wall of the blow mould.

It will be apparent to those skilled in the art that various modifications and variations can be made to the aseptic blow moulding machine of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. An apparatus for the shaping of plastics material pre-forms into plastics material containers, the apparatus comprising:
    at least one blow mould with at least two blow mould parts capable of being moved with respect to each other, the blow mould forming a cavity inside which the plastics material pre-forms are capable of being shaped into the plastics material containers, an inner wall of the blow mould facing the plastics material pre-form having an opening through which a first flowable medium is capable of being removed out of the cavity during the expansion procedure;
    a stressing device which acts upon the plastics material preforms with a second flowable medium for their expansion;
    a conveying device which conveys the blow mould along a preset conveying path;
    a clean room, inside which the blow mould is capable of being conveyed during the expansion of the plastics material pre-forms; and
    a flow connection between the opening and the clean room, said flow connection being sealed off from a non-sterile environment of the clean room.

2. An apparatus according to claim 1, further including a supply line configured to supply a flowable sterilization agent to the blow mould, a flow connection being present at least for a time between the supply line and the opening.

3. An apparatus according to claim 2, further including a storage device for storing the flowable sterilization agent, said storage device being connected in terms of flow at least for a time to the opening.

4. An apparatus according to claim 2, wherein the flow connection extends at least locally over the stressing device.

5. An apparatus according to claim 1, further comprising a by-pass element, which is movable with respect to the blow mould.

6. An apparatus according to claim 1, wherein the blow mould includes at least one duct for conveying at least one of the first flowable medium, the second flowable medium, and the sterilization agent, said duct being connected in terms of flow to the opening and extending in a longitudinal direction of the blow mould.

7. A blow mould for shaping plastics material pre-forms into plastics material containers, the blow mould comprising:
    at least one first blow mould part and one second blow mould part, the two blow mould parts being movable with respect to each other, and the blow mould parts forming a cavity inside which the plastics material pre-forms are capable of being expanded to form the plastics material containers by being acted upon with a gaseous medium; and
    at least one opening in a wall of the blow mould facing the plastics material pre-forms through which a gaseous medium is removed during an expansion procedure, and through which a flowable sterilization agent is supplied to the blow mould during a sterilization procedure, the opening being connected in terms of flow to a duct extending inside a wall in the blow mould, said duct extending in a longitudinal direction of the blow mould.

8. A blow mould according to claim 7, wherein the duct extending inside the wall is connected in terms of flow to the opening by way of a connecting duct.

9. An apparatus according to claim 1, wherein the at least one blow mould shapes the plastics material pre-forms to form the plastics material containers, and wherein the conveying device conveys the at least one blow mould along a pre-set conveying path inside a clean room at least partially during expansion of the plastics material pre-forms, wherein a medium is removed through the opening at least partially during expansion of the plastics material pre-forms, and wherein a flowable sterilization medium is supplied through the opening during sterilization of the at least one blow mould, and wherein, starting from the opening, the medium passes exclusively into the clean room.

10. The apparatus of claim 9, wherein the medium is a gaseous medium.

11. The apparatus of claim 1, wherein the at least two blow mould parts comprise a first set of blow mould parts and a second set of blow mould carrier parts, wherein the first set of blow mould parts are not arranged directly on the second set of blow mould carrier parts, and wherein carrier shells are arranged on the second set of blow mould carrier parts on to which the the first set of blow mould parts are fastened.

* * * * *